United States Patent
Lundby et al.

(10) Patent No.: US 6,985,453 B2
(45) Date of Patent: Jan. 10, 2006

(54) METHOD AND APPARATUS FOR LINK QUALITY FEEDBACK IN A WIRELESS COMMUNICATION SYSTEM

(75) Inventors: Stein A. Lundby, Solana Beach, CA (US); Leonid Razoumov, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 833 days.

(21) Appl. No.: 09/784,807

(22) Filed: Feb. 15, 2001

(65) Prior Publication Data

US 2002/0110088 A1 Aug. 15, 2002

(51) Int. Cl.
*G08C 17/00* (2006.01)
*H04B 7/00* (2006.01)

(52) U.S. Cl. .................................. 370/311; 455/522
(58) Field of Classification Search ............... 370/252, 370/311, 328, 342, 253, 329, 335, 338, 352; 455/442, 522
See application file for complete search history.

(56) References Cited

U.S. PATENT DOCUMENTS

| | | | | |
|---|---|---|---|---|
| 5,726,978 A | * | 3/1998 | Frodigh et al. | 370/252 |
| 6,167,031 A | * | 12/2000 | Olofsson et al. | 370/252 |
| 6,385,462 B1 | * | 5/2002 | Baum et al. | 455/522 |
| 6,456,598 B1 | * | 9/2002 | Le Strat et al. | 370/252 |
| 6,574,211 B2 | * | 6/2003 | Padovani et al. | 370/347 |
| 6,741,862 B2 | * | 5/2004 | Chung et al. | 455/452.1 |
| 2002/0016177 A1 | * | 2/2002 | Miya et al. | 455/522 |
| 2003/0099209 A1 | * | 5/2003 | Laakso et al. | 370/311 |

* cited by examiner

*Primary Examiner*—Hassan Kizou
*Assistant Examiner*—Hong Sol Cho
(74) *Attorney, Agent, or Firm*—Philip R. Wadsworth; Thien T. Nguyen; Rupit Patel

(57) ABSTRACT

Method and apparatus for providing link quality feedback to a transmitter in one embodiment, a periodic link quality message is transmitted on a gated channel, while continuous differential indicators are transmitted. Between quality messages, the differential indicators track the quality of the link. The periodic quality messages provide synchronization to the transmitter and receiver. A coding is applied to the feedback information identifying the transmitter, in one embodiment, a remote station includes a differential analyzer (212) to determine the change in successive channel quality measurements. In an alternate embodiment, link quality feedback information is gated according to channel condition.

13 Claims, 13 Drawing Sheets

| DRC MESSAGE | RATE (kbps) | PACKET LENGTH (slots) |
|---|---|---|
| 0x0 | null rate | N/A |
| 0x1 | 38.4 | 16 |
| 0x2 | 76.8 | 8 |
| 0x3 | 153.6 | 4 |
| 0x4 | 307.2 | 2 |
| 0x5 | 307.2 | 4 |
| 0x6 | 614.4 | 1 |
| 0x7 | 614.4 | 2 |
| 0x8 | 921.6 | 2 |
| 0x9 | 1228.8 | 1 |
| 0xa | 1228.8 | 2 |
| 0xb | 1843.2 | 1 |
| 0xc | 2457.6 | 1 |
| 0xd | INVALID | N/A |
| 0xe | INVALID | N/A |
| 0xf | INVALID | N/A |

FIG. 8

METHOD AND APPARATUS FOR LINK QUALITY FEEDBACK IN A WIRELESS COMMUNICATION SYSTEM

BACKGROUND

1. Field

The present method and apparatus relate generally to communication, and more specifically to providing link quality feedback in a wireless communication system.

2. Background

Increasing demand for wireless data transmission and the expansion of services available via wireless communication technology have led to the development of systems capable of handling voice and data services. One spread spectrum system designed to handle the various requirements of these two services is a Code Division Multiple Access, CDMA, system referred to as cdma2000, which is specified in "TIA/EIA/IS-2000 Standards for cdma2000 Spread Spectrum Systems." Enhancements to cdma2000 as well as alternate types of voice and data systems are also in development.

As the amount of data transmitted and the number of transmissions increase, the limited bandwidth available for radio transmissions becomes a critical resource. There is a need, therefore, for an efficient and accurate method of transmitting information in a communication system that optimizes use of available bandwidth.

SUMMARY

Embodiments disclosed herein address the above stated needs by providing a remote station apparatus having a quality measurement unit for iteratively measuring link quality of a communication link, and a differential analyzer for determining changes in the measured link quality.

In one aspect, in a wireless communication system for processing voice communications and packet-switched communications, a transceiver includes a data rate control table listing data rate control messages and associated transmission information, a data rate calculation unit coupled to the data rate control table, the data rate calculation unit operative to select a data rate control message in response to a received signal at the transceiver, and a differential analyzer coupled to the data rate calculation unit operative to generate differential indicators pointing to a next entry in the data rate control table.

In another aspect, in a wireless communication system, a method includes generating quality messages at a first frequency, the quality message providing information on the quality of a communication link, and generating differential indicators at a second frequency, the differential indicators indicating changes in the quality of the communication link, wherein the second frequency is greater than the first frequency.

BRIEF DESCRIPTION OF THE DRAWINGS

FIG. 8 is a diagram of a data rate control table applicable for packet-switched communications.

DETAILED DESCRIPTION

Figure 1:
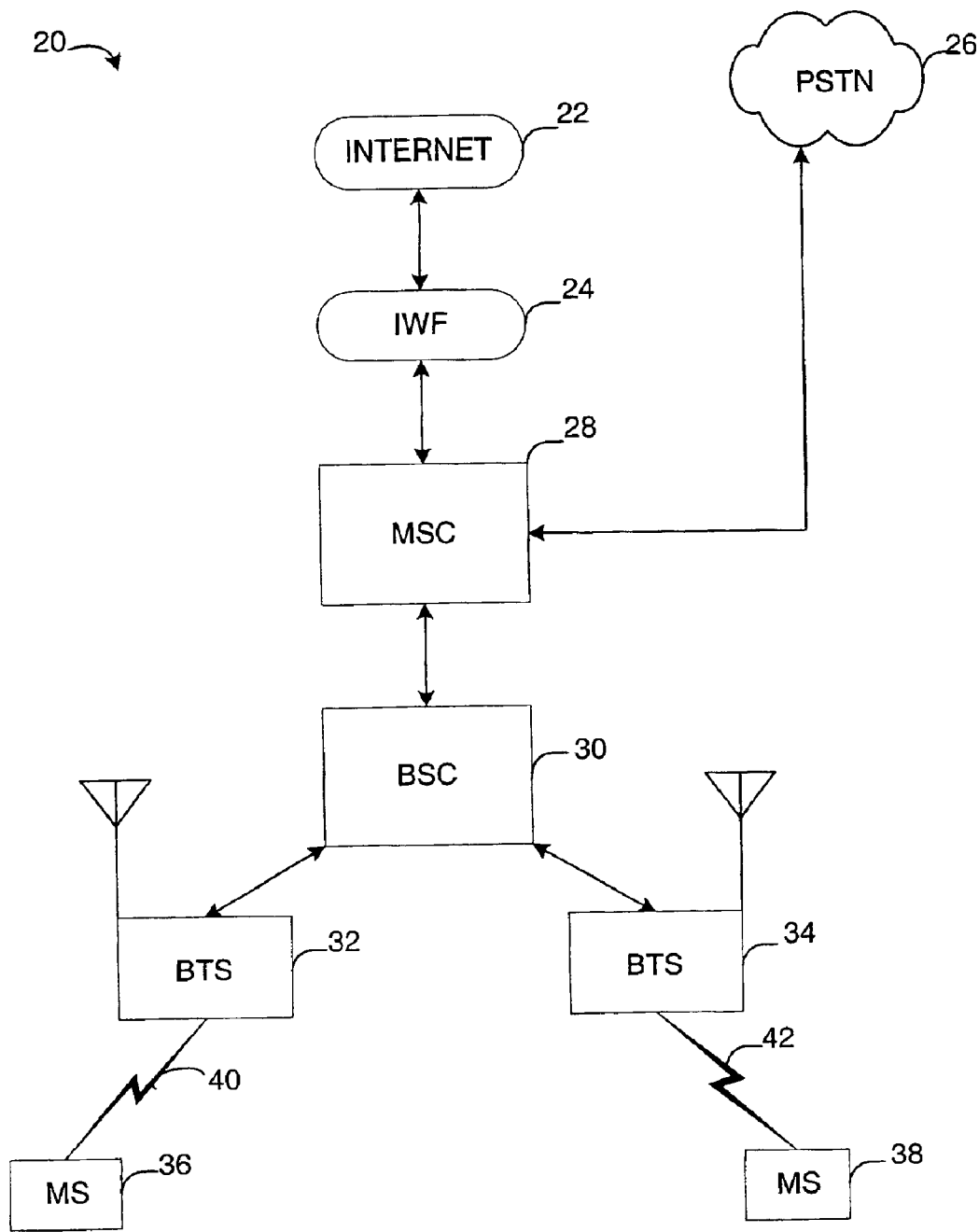
FIG. 1 is a diagram of a wireless communication system.

The word "exemplary" is used exclusively herein to mean "serving as an example, instance, or illustration." Any embodiment described herein as "exemplary" is not necessarily to be construed as preferred or advantageous over other embodiments.

In a spread-spectrum wireless communication system, such as a cdma2000 system, multiple users transmit to a transceiver, often a base station, in the same bandwidth at the same time. The base station may be any data device that communicates through a wireless channel or through a wired channel, for example using fiber optic or coaxial cables. A user may be any of a variety of mobile and/or stationary devices including but not limited to a PC card, a compact flash, an external or internal modem, or a wireless or a wireline phone. A user is also referred to as a remote station. Note that alternate spread-spectrum systems include systems: packet-switched data services; Wideband-CDMA, W-CDMA, systems, such as specified by Third Generation Partnership Project, 3GPP; voice and data systems, such as specified by Third Generation Partnership Project Two, 3GPP2.

The communication link through which the user transmits signals to the transceiver is called a Reverse Link, RL. The communication link through which a transceiver sends signals to a user is called a Forward Link, FL. As each user transmits to and receives from the base station, other users are concurrently communicating with the base station. Each user's transmissions on the FL and/or the RL introduces interference to other users. To overcome interference in the received signals, a demodulator seeks to maintain a sufficient ratio of bit energy to interference power spectral density, $E_b/N_0$, in order to demodulate the signal at an acceptable probability of error. Power Control, PC, is a process that adjusts the transmitter power of one or both of the Forward Link, FL, and the Reverse Link, RL, to satisfy a given error criteria. Ideally, the power control process adjusts the transmitter power(s) to achieve at least the minimum required $E_b/N_0$ at the designated receiver. Still further, it is desirable that no transmitter uses more than the minimum $E_b/N_0$. This ensures that any benefit to one user achieved through the power control process is not at the unnecessary expense of any other user.

Power control impacts the capacity of the system by ensuring that each transmitter only introduces a minimal amount of interference to other users and thus increases processing gain. Processing gain is the ratio of the transmission bandwidth, W, to the data rate, R. The ratio of $E_b/N_0$ to W/R corresponds to the Signal-to-Noise Ratio, SNR. Processing gain overcomes a finite amount of interference from other users, i.e., total noise. System capacity is, therefore, proportional to processing gain and SNR. For data, feedback information is provided from the receiver to the transmitter as a link quality measure. The feedback ideally is of fast transmission with low latency.

Power control allows the system to adapt to changing conditions within an environment, including but not limited to the geographical conditions and mobile velocity. As the changing conditions impact the quality of a communication link, the transmission parameters adjust to accommodate the changes. This process is referred to as link adaptation. It is desirable for link adaptation to track the condition(s) of the system as accurately and quickly as possible.

According to one embodiment, link adaptation is controlled by the quality of a communication link, wherein the SNR of the link provides a quality metric for evaluating the link. The SNR of the link may be measured as a function of Carrier-to-Interference, C/I, at the receiver. For voice communications, the quality metric C/I may be used for providing power control commands instructing the transmitter to either increase or decrease power. For packet data communications, such as an HDR system as specified in "TIA-856 cdma2000 High Rate Packet Data Air Interface Specification," 3GPP, and 3GPP2 data communications are scheduled among multiple users, where at any given time, only one user receives data from the access network or base station. In a packet-switched data system, the quality metric measurement, such as SNR and/or C/I, may provide valuable information to the base station or access network transmitter in determining proper data rate, encoding, modulation and scheduling of data communications. Therefore, it is beneficial to provide the quality metric efficiently from the remote station to the base station.

FIG. 1 illustrates one embodiment of a wireless communication system 20, wherein system 20 is a spread spectrum CDMA system capable of voice and data transmissions. System 20 includes two segments: a wired subsystem and a wireless subsystem. The wired subsystem is the Public Switched Telephone Network, PSTN 26, and the Internet 22. The Internet 22 portion of the wired subsystem interfaces with the wireless subsystem via Inter-Working Function Internet, IWF 24. The ever-increasing demand for data communications is typically associated with the Internet and the ease of access to the data available thereby. However, advancing video and audio applications increase the demand for transmission bandwidth.

The wired subsystem may include but is not limited to other modules such as an instrumentation unit, a video unit, etc. The wireless subsystem includes the base station subsystem, which involves the Mobile Switching Center, MSC 28, the Base Station Controller, BSC 30, the Base Transceiver Station(s), BTS(s) 32, 34, and the Mobile Station(s), MS(s) 36, 38. The MSC 28 is the interface between the wireless subsystem and the wired subsystem. It is a switch that talks to a variety of wireless apparatus. The BSC 30 is the control and management system for one or more BTS(s) 32, 34. The BSC 30 exchanges messages with the BTS(s) 32, 34 and the MSC 28. Each of the BTS(s) 32, 34 consist of one or more transceivers placed at a single location. Each of the BTS(s) 32, 34 terminates the radio path on the network side. The BTS(s) 32, 34 may be in co-located with BSC 30 or may be independently located.

The system 20 includes radio air interface physical channels 40, 42 between the BTS(s) 32, 34 and the MS(s) 36, 38. The physical channels 40, 42 are communication paths described in terms of the digital coding and RF characteristics.

As discussed herein above, a FL is defined as a communication link for transmissions from one of the BTS(s) 32, 34 to one of the MS(s) 36, 38. An RL is defined as a communication link for transmissions from one of the MS(s) 36, 38 to one of the BTS(s) 32, 34. According to one embodiment, power control within system 20 includes controlling transmit power for both the RL and the FL. Multiple power control mechanisms may be applied to the FL and RL in system 20, including reverse open loop power control, reverse closed loop power control, forward closed loop power control, etc. Reverse open loop power control adjusts the initial access channel transmission power of MS(s) 36, 38, and compensates for variations in path loss attenuation of the RL. The RL uses two types of code channels: traffic channel(s), and access channel(s).

Figure 2:
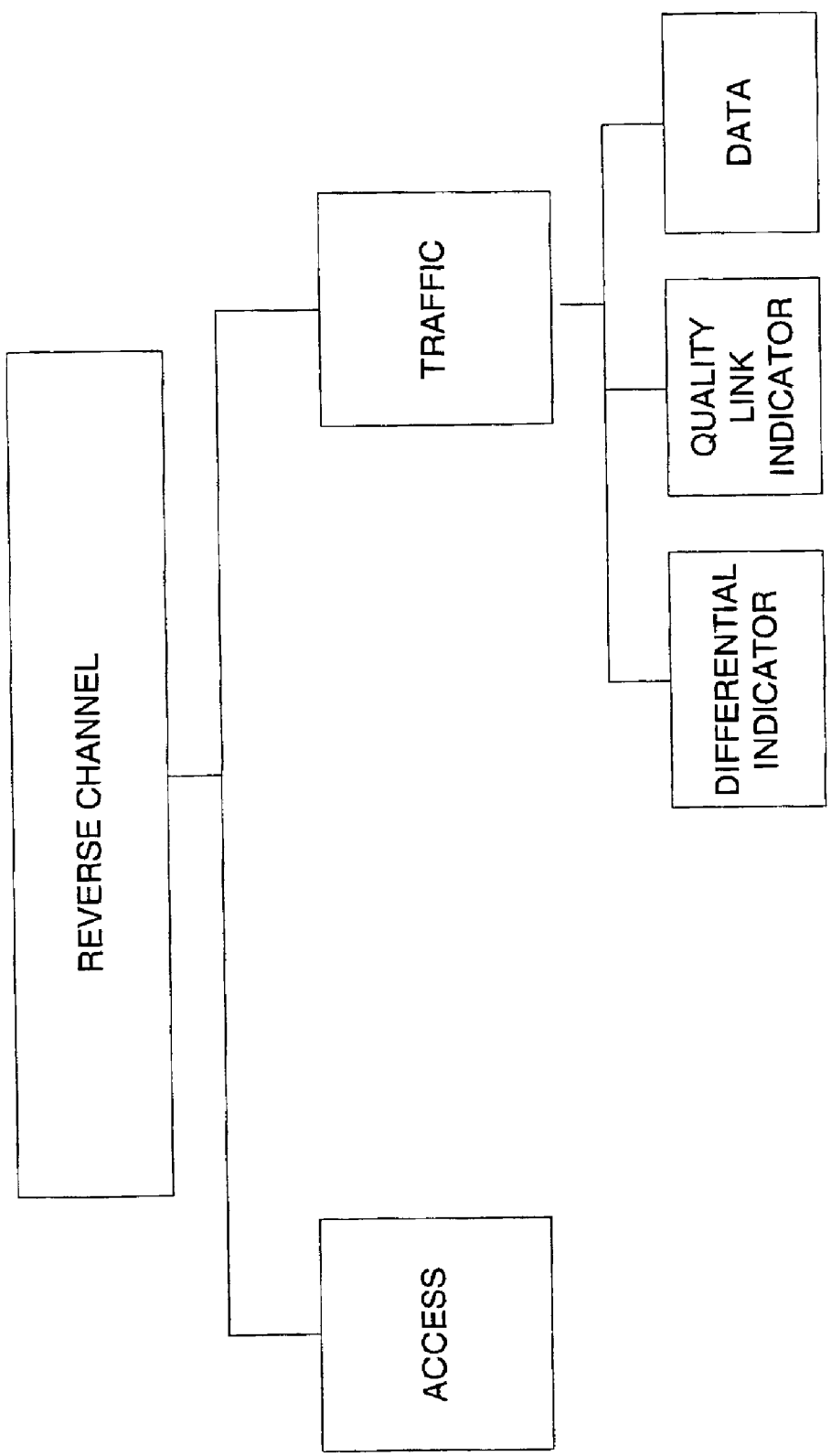
FIG. 2 is a diagram of a reverse channel architecture in a wireless communication system.

FIG. 2 illustrates the architecture of a RL of system 20 of FIG. 1 according to one embodiment. The RL or reverse channel is composed of two types of logical channels: access and traffic. Each logical channel is a communication path within the protocol layers of either the BTS(s) 32, 34 or the MS(s) 36, 38. Information is grouped onto a logical channel based upon criteria such as the number of users, the transmission type, the direction of the transfer, etc. The information on a logical channel is ultimately carried on one or more physical channels. Mappings are defined between logical and physical channels. These mappings may be permanent or may be defined only for the duration of a given communication.

Note that for data services a remote station may be referred to as an Access Terminal, AT, wherein an AT is a device providing data connectivity to a user. An AT may be connected to a computing device, such as a laptop personal computer, or it may be a self-contained data device, such as a personal digital assistant. Further, the base station may be referred to as an Access Network, AN, wherein the AN is network equipment providing data connectivity between a packet switched data network, such as the Internet, and at least one AT. The reverse access channel is used by ATs to communicate with the AN when no traffic channel is assigned. In one embodiment there is a separate reverse access channel for each sector of the AN.

Continuing with FIG. 2, the traffic channel is composed of three logical channels: differential indicator; link quality indicator; and data. The link quality indicator provides a measure of the quality of the FL pilot channel. One embodiment uses Carrier-to-Interference, C/I, as a link quality metric, wherein the remote station measures the C/I of the FL pilot channel for multiple instances having a predetermined period. The link quality indicator is encoded for periodic transmission to the base station on the RL. The encoding may include the application of a cover, wherein the specific cover applied corresponds to the sector of the measured pilot signal. The encoded link quality indicator is referred to as a "quality message." Alternate embodiments may implement other means of determining a link quality indicator and may implement other metrics corresponding to link quality. Additionally, the quality metric measurements may be applied to other received signals. The C/I measurement is often expressed in dB units.

In the exemplary embodiment, the link quality message is determined and transmitted periodically with relatively low latency to reduce any impact on available bandwidth on the RL. In one embodiment the link quality message is transmitted once every 20 msec. In addition, a differential indicator is transmitted to the base station on the RL when the link quality indicator is not transmitted. In one embodiment the differential indicator is sent ever 1.25 msec. As illustrated in FIG. 2, the traffic channel further includes the differential indicator sub-channel. In contrast to the link quality indicator and quality message, the differential indicator is an indication of relative changes in the quality of the FL pilot channel, which is sent much more frequently. To determine the differential indicator, a comparison is made of successive C/I measurements of the FL pilot signal. The result of the comparison is transmitted as a bit or bits indicating the direction of the change. For example, according to one embodiment for an increase in successive C/I measurements the differential indicator is positive, and for a decrease in successive C/I measurements the differential indicator is negative. The differential indicator is transmitted with little or no coding, and therefore provides a fast, efficient, low latency feedback method. The differential indicator effectively provides continuous fast feedback to the base station regarding the state of the FL. The feedback is sent via the RL. Note that in contrast to power control commands which typically have an opposite polarity to the C/I measurement, the quality message and the differential indicator track the C/I measurement.

The use of a differential indicator eliminates the need to transmit the entire C/I, wherein the differential indicator provides incremental comparisons to the last projected value. The differential indicator according to one embodiment is an UP (+1 dB) or DOWN (−1 dB) indicator. According to an alternate embodiment, successive steps in a same direction have increasing values, such as first UP (+1 dB), second UP (+2 dB), etc. In yet another embodiment the differential indicator includes multiple bits, wherein the bits have significance to identify the direction and amount of change. Since the fading channel is a continuous process, the C/I will be a continuous process and can therefore be tracked with such a differential signaling technique. Since this differential message is much smaller than the full C/I message, not only does it take less time to encode, to transmit, and to decode, but it also takes up less energy on the reverse link. This means that not only is the FL performance improved, but the RL loading is also reduced. The periodic transmission of a quality message prevents and/or corrects synchronization problems between the base station and remote station. For example, consider a remote station having an initial quality message corresponding to 0 dB C/I measurement. The remote station continuously measures the link quality and proceeds to transmit three differential indicators, each corresponding to 1 dB increments. Thus, the remote station has calculated a projected C/I of 3 dB. The base station may decode two of the differential indicators correctly, and have a decode error on a third. The base station has, therefore, calculated a projected C/I of 2 dB. At this point, the remote station and the base station are out of synchronization. The next transmission of the encoded quality message is transmitted in a reliable manner and will correct the synchronization disparity. In this way, the quality message re-synchronizes the base station and the remote station. In one embodiment the quality message is encoded using a very powerful (5, 24) block code, interleaved, and transmitted over 20 ms. Note that the quality message is used to correct any synchronization errors that could have occurred in feeding back the differential indicators, and therefore, the quality message can tolerate relatively large latencies, such as 20 ms.

The differential indicator is applicable in wireless communication systems using fast link adaptation techniques that require the receiver to constantly feedback the latest channel state to the transmitter. While the differential indicator is also applicable for feedback on FL of the RL channel state, in data services, link adaptation typically occurs on the forward link, and therefore the exemplary embodiment illustrates a remote station feeding information to the base station about the state of the FL using differential indicators on the RL. Ideally link quality feedback occurs frequently with minimum delay to maximize FL system performance. The use of a differential indicator reduces loading on the RL, thereby increasing the capacity of the RL available for data traffic.

Figure 3A:
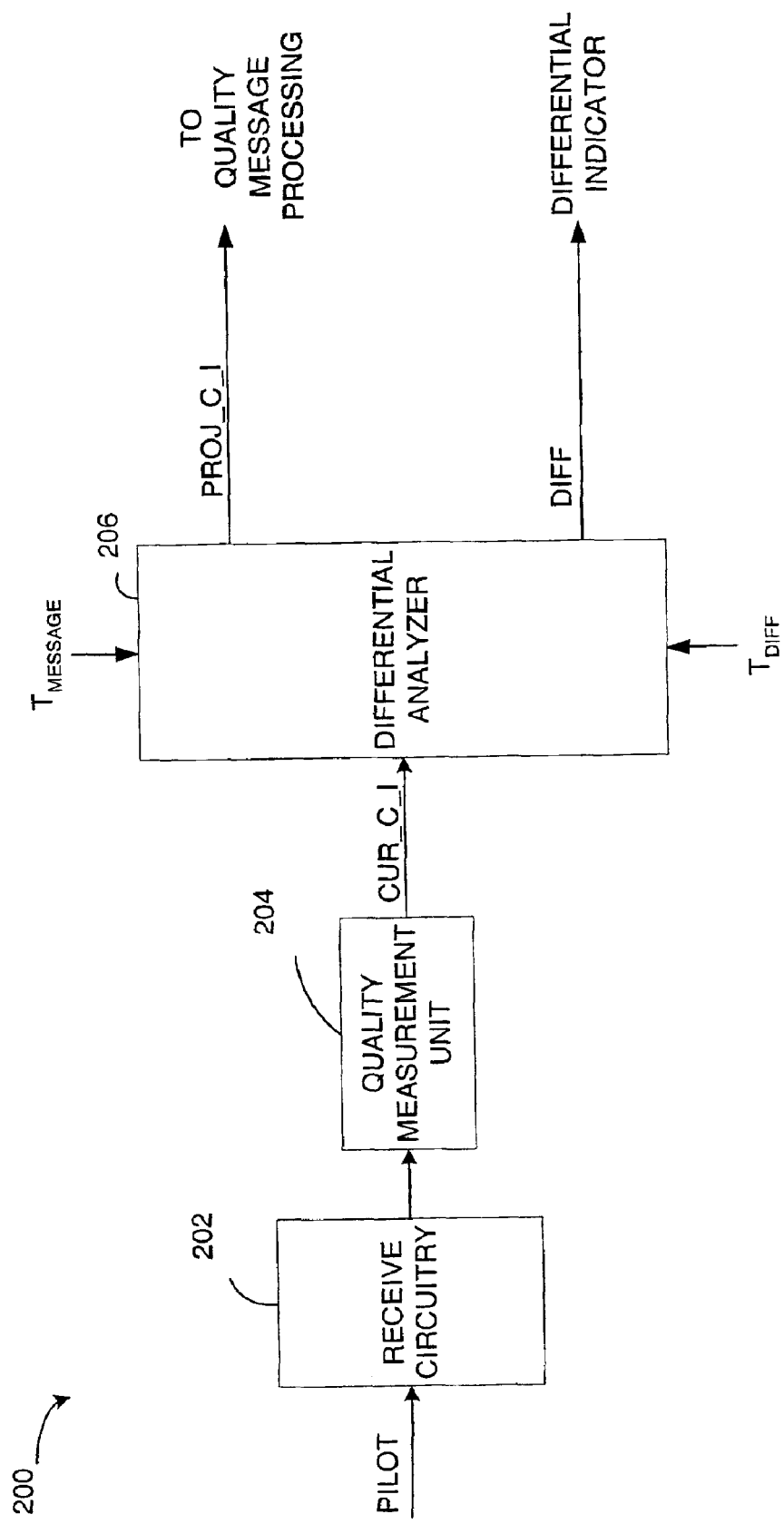
FIG. 3A is a diagram of a remote station in a wireless communication system.

A portion of a remote station 200 for use in the system 20 is illustrated in FIG. 3A. The remote station 200 includes receive circuitry 202 that includes but is not limited to an antenna(s), and pre-processing filtering. The receive circuitry 202 processes signals received at the remote station 200 on the FL, including but not limited to the pilot signal. The receive circuitry 202 is coupled to quality measurement unit 204 that determines the quality metric measurement of the pilot signal. In the exemplary embodiment, the quality measurement unit 204 measures the C/I of the received FL pilot signal. The quality metric measurement, cur_C_I, is provided to differential analyzer 206. The differential analyzer 206 is responsive to a predetermined quality message period, $T_{MESSAGE}$. Within each quality message period, the differential analyzer 206 provides one projected C/I measurement, proj_C_I, as a link quality indicator for further processing to form the quality message. The further processing includes encoding the link quality indicator, including application of a cover identifying the transmission sector of the measured pilot signal. For the remainder of the period, the quality measurement unit 204 provides successive C/I measurements to the differential analyzer 206.

Continuing with FIG. 3A, during each time period $T_{MESSAGE}$ the quality message is generated once and multiple differential indicators are generated, wherein each generated differential indicator is referred to as "DIFF." Note that the quality message and the differential indicator are generated at different rates. As illustrated in FIG. 3A, the differential analyzer 206 also receives an input signal, $T_{DIFF}$, controlling the rate of differential indicator generation.

Figure 3B:
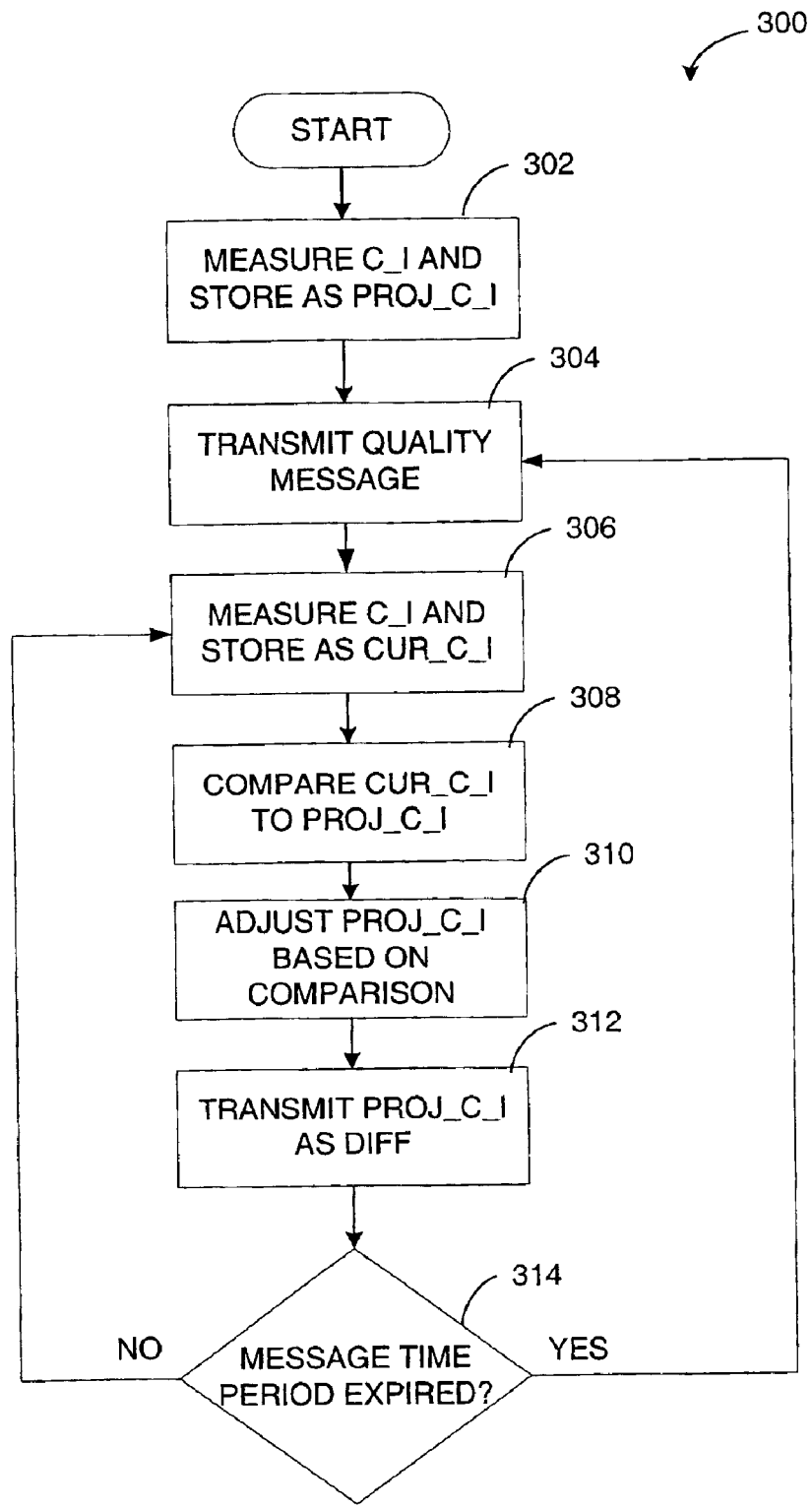
FIG. 3B is a flow diagram of a method for generating link quality feedback from a remote station in a wireless system.

Operation of the differential analyzer 206 in a remote station according to one embodiment is detailed in FIG. 3B. According to one embodiment illustrated in FIG. 3B, in a remote station, the differential analyzer 206 process starts by receiving a C/I measurement from the quality measurement unit 204, wherein the cur_C_I is a link quality measure of a received signal. The process also stores the cur_C_I value as a projected measurement in a variable "proj_C_I" at step 302. Step 302 is an initialization step an is performed only once per session. At this point no historical C/I measurements are available for a comparison.

At step 304 the proj_C_I value is transmitted as the quality message. At step 306 the C/I is measured and stored as a current measurement in a variable "cur_C_I" to be used for incremental differential comparisons. At step 308 the differential analyzer 206 compares cur_C_I to proj_C_I and generates DIFF accordingly. Additionally, the variable proj_C_I is adjusted in accordance with the comparison at step 310. The adjustment tracks changes in the link quality and, therefore, if cur_C_I is greater than proj_C_I, the value proj_C_I is increased and vice versa. The differential indicator, DIFF, is transmitted at step 312, wherein DIFF has been determined by the comparison of cur__C__I and proj__C__I. Note that DIFF provides an indication of the direction of change in link quality. In one embodiment DIFF is a single bit, wherein a positive value corresponds to an increase and a negative value corresponds to a decrease. Alternate polarity schemes may be implemented as well as multiple bits to represent DIFF, which provides an indication of the amount of change in addition to the direction of the change.

At step 314, the process determines if the quality message time period has expired. Within each quality message time period one quality message is transmitted, while multiple differential indicators are transmitted. On expiration of the quality message time period, the process returns to step 304. Until expiration of the quality message time period, the process returns to step 306. In this way, the remote station provides a quality message with the full projected C/I information, i.e., proj__C__I, and successive differential indicators to track changes to the projected C/I. Note that in one embodiment, each differential indicator is assumed to correspond to a predetermined step size. In an alternate embodiment the differential indicator is assumed to correspond to one of several predetermined step sizes. In another embodiment the amplitude of the differential indicator determines the step size. In another embodiment the differential indicator includes multiple information bits, wherein the bits have significance to select the direction and amplitude of the step size among a set of predetermined step sizes. In yet another alternate embodiment, the step size may change dynamically.

Figure 3C:
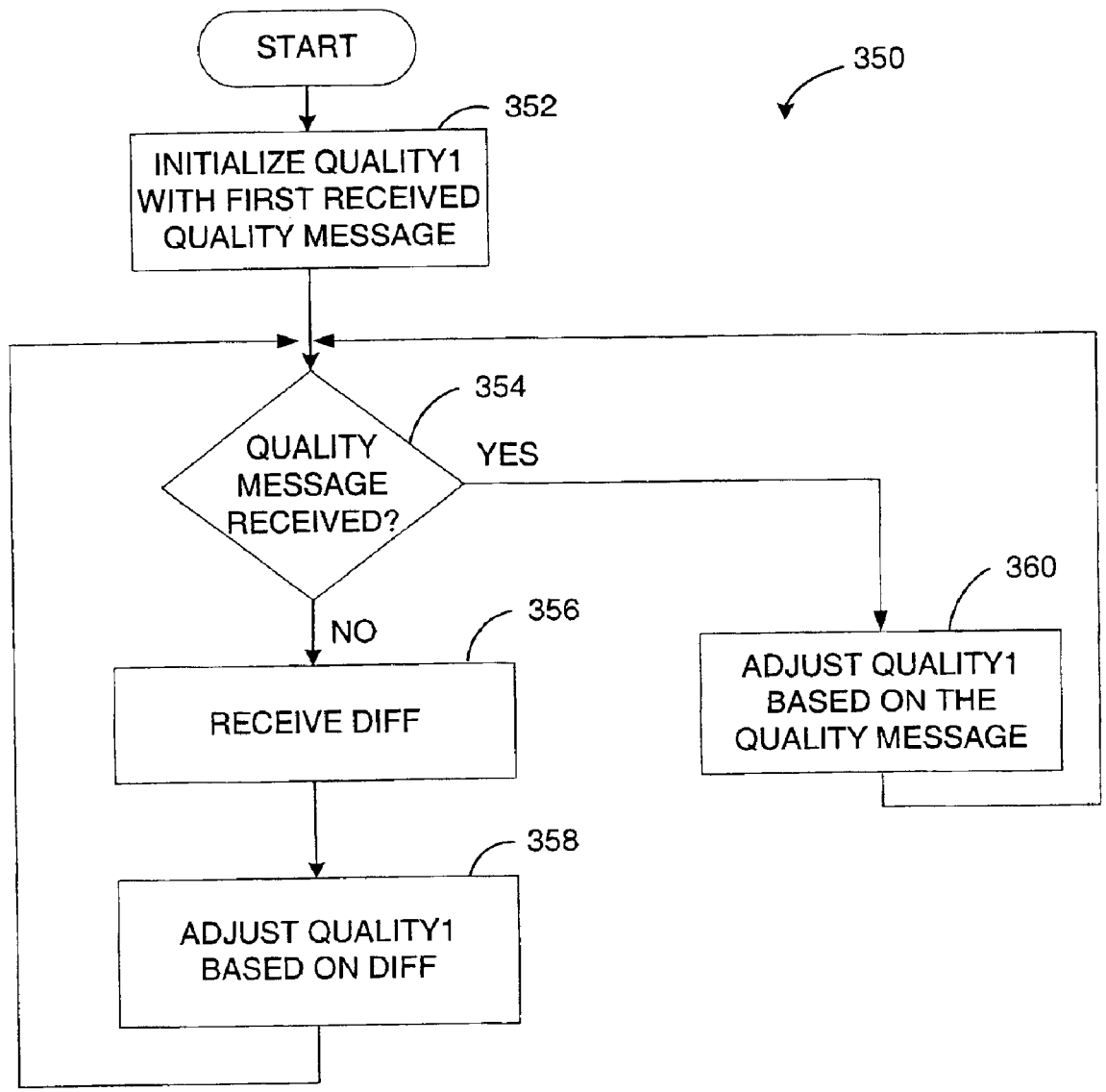
FIG. 3C is a flow diagram of a method for processing link quality feedback at a base station in a wireless system.

FIG. 3C illustrates a method 350 for processing quality messages and differential indicators at a base station. A variable "QUALITY1" is initialized to a default value at step 352 with the first received quality message. The default value may be based on an initially received quality message. The process then determines if a quality message is received at step 354. On receipt of a quality message, QUALITY1 is updated based on the quality message received at step 360. The process then returns to step 354. When no quality message has been received and a DIFF is received at step 356, the process continues to step 358 where QUALITY1 is adjusted based on DIFF. The process then returns to step 354.

Figure 3D:
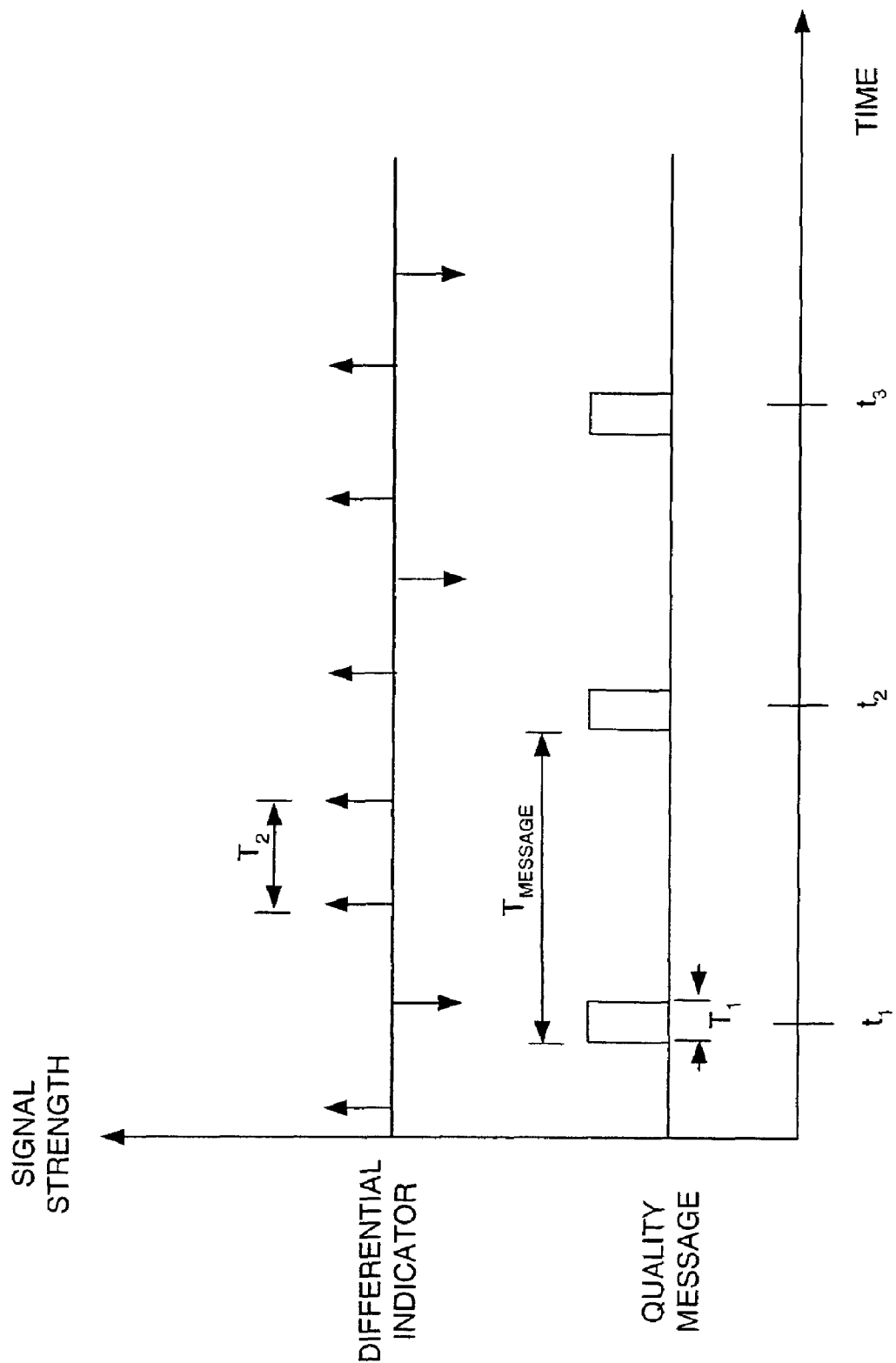
FIG. 3D is a timing diagram illustrating link quality feedback in a wireless system.

According to one embodiment, the quality message is transmitted on a gated channel, wherein transmissions are made once each time period $T_{message}$. Differential indicators are transmitted at a higher frequency on a continuous channel. A diagram of the signal strength of quality messages and the differential indicators are plotted as a function of time, as illustrated in FIG. 3D. The quality messages are transmitted at times $t_1$, $t_2$, $t_3$, etc., wherein no quality messages are transmitted at other times within each period $T_{message}$. The differential indicators are transmitted continuously. In the exemplary embodiment, the quality message is transmitted for predetermined time duration $T_1$. The differential indicators are separated by time duration $T_2$. Ideally $T_2$ is greater than $T_1$, wherein no differential indicator is transmitted within the time duration $T_1$ for transmission of the quality message. In this way, the base station does not receive a differential indicator and a quality message at a same given time. In practice, if a differential indicator overlaps a quality message in time, the base station uses the quality message.

The quality messages and the differential indicators provide feedback to the base station. While FIG. 3D illustrates distinct and separate occurrences of quality messages and differential indicators, the quality message may be sent over a longer time period creating overlap between transmissions.

In one embodiment, the quality message may be encoded and transmitted, wherein the C/I messages are processed very slowly. The quality message would then be received and decoded at the base station much later. The base station effectively pipelines the differential indicators and is able to back out of a calculation path and return to find the projected measurement at the time when the message was encoded and transmitted by the remote station. If the base station finds that the quality message shows an incorrect calculation, i.e., result after application of differential indicators, the result is adjusted according to the quality message. For example, where the projected measurement was off by +2 dB, then the current projected measurement could be increased by 2 dB.

Figure 4A:
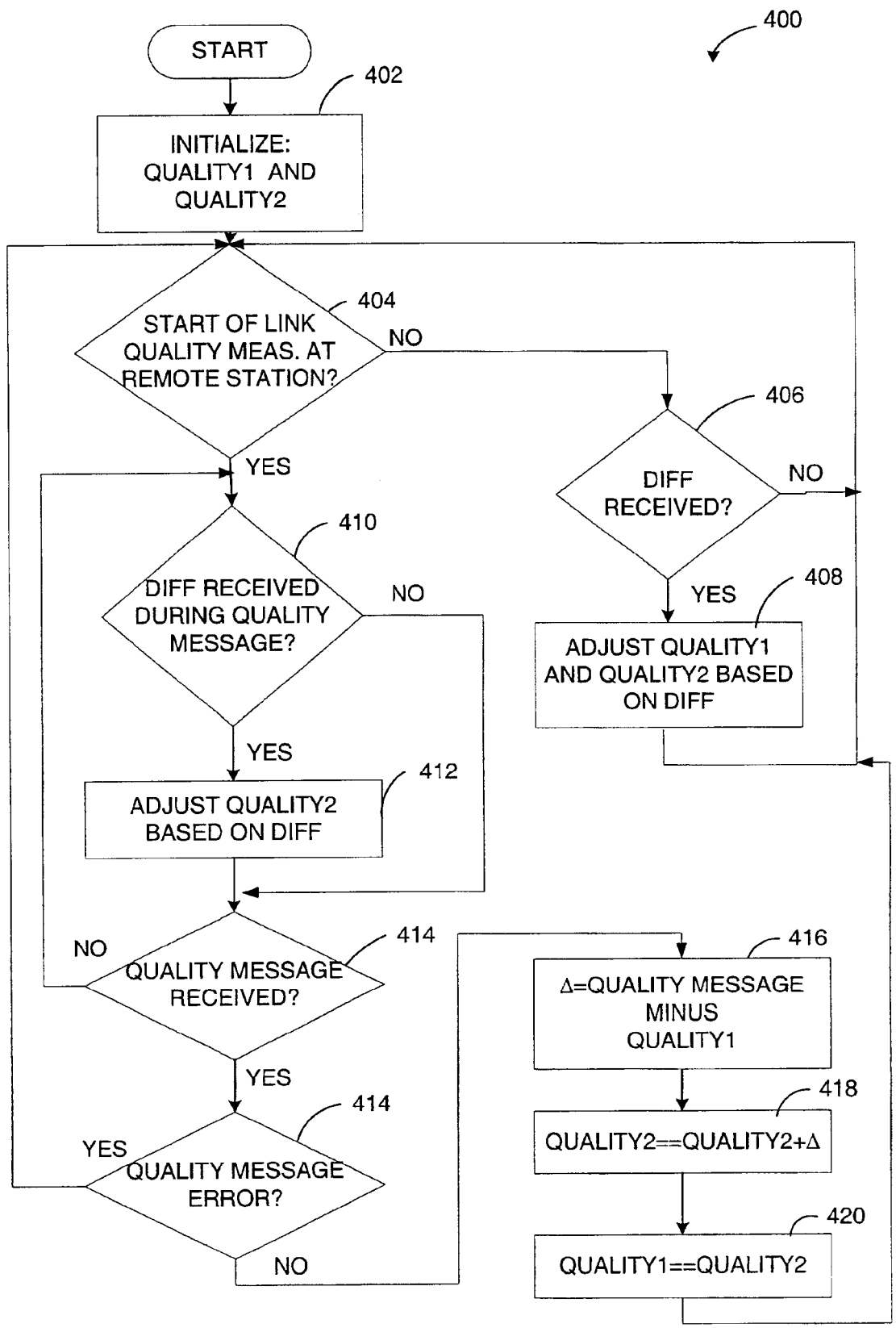
FIG. 4A is a flow diagram of an alternate method of link quality feedback at a base station in a wireless communication system.
Figures 4B, 4C:
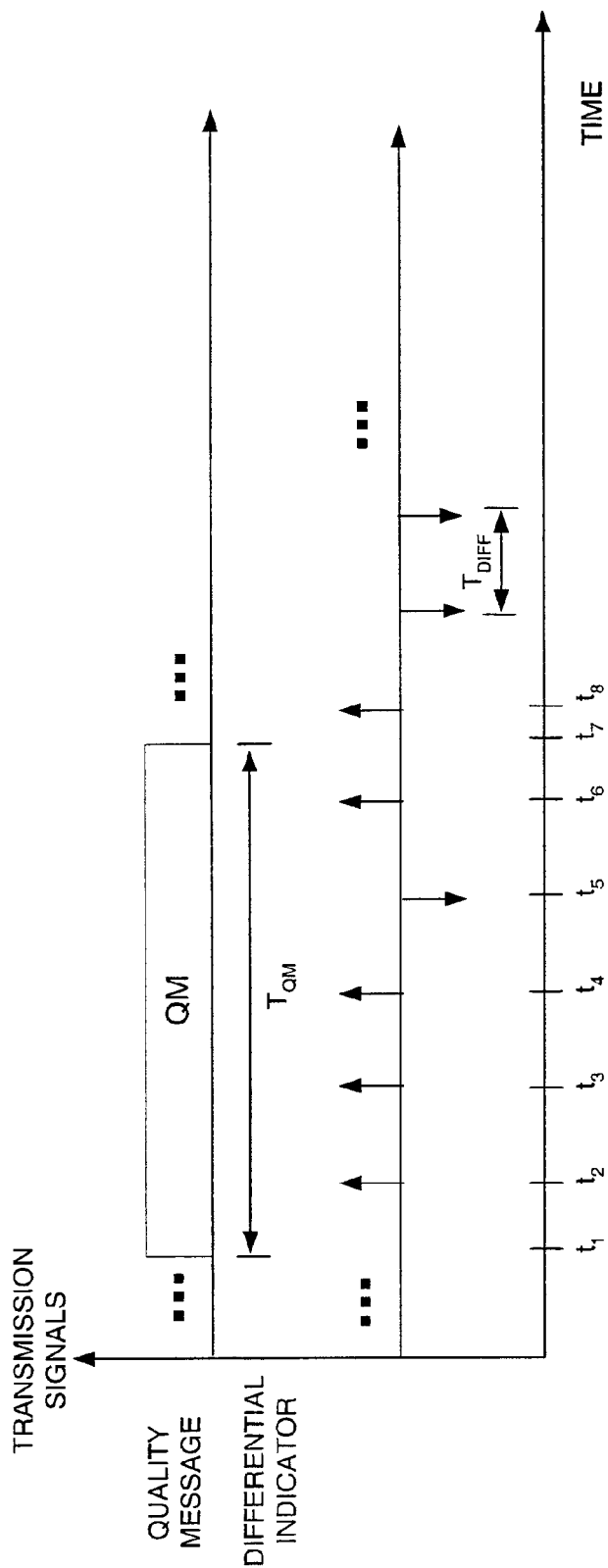
FIG. 4B is a timing diagram illustrating link quality feedback in a wireless system.
FIG. 4C is a tabular diagram tracking variables during link quality feedback in a wireless system.

One scenario is illustrated in FIG. 4B, discussed hereinbelow. FIG. 4A illustrates an alternate method 400 of processing received quality messages and differential indicators at a base station, wherein overlap may occur between quality messages and differential indicators. Two variables, QUALITY1 and QUALITY2, are initialized at step 402 with the first received quality message. During receipt of a quality message, the value stored in QUALITY1 at the start of the link quality measurement at the mobile station is maintained without change until the quality message is completely received. This allows adjustment for any DIFF (s) received during the quality message. The process 400 determines if receipt of a link quality measurement has started at step 404. The base station has a priori knowledge of the scheduling of link quality measurements at the remote station. If a quality measurement has not begun the process continues to step 406 to determine if a DIFF has been received. If no DIFF is received processing returns to step 404, else QUALITY1 and QUALITY2 are adjusted based on DIFF at step 408 and then processing returns to step 404. Additionally at step 408, the QUALITY2 value is provided to a scheduler for implementation of a schedule of transmissions. From step 404, if a quality message has started, step 410 determines if a DIFF is received during a quality message, i.e., a DIFF and a quality message are both being received at the same time by the base station. If no DIFF is received during the quality message, the process continues to step 414 to determine if the quality message is complete. If a DIFF is received during the quality message, QUALITY2 is adjusted based on DIFF AT STEP 412. Additionally at step 412, the QUALITY2 value is provided to a scheduler for implementation of a schedule of transmissions. If the quality message is not complete at step 414, processing returns to step 410, else, the difference between the received quality message and QUALITY1 is set equal to DELTA, $\Delta$ at step 416. The DELTA is used to correct the link quality calculations at the base station. As the quality message was transmitted from the remote station prior to DIFF values received during receipt of the quality message at the base station, the DELTA allows application of these DIFF values to the corrected value. QUALITY2 is adjusted by DELTA at step 418 to correct the result of processing the DIFF(s) received during receipt of the quality message. Additionally at step 418, the QUALITY2 value is provided to a scheduler for implementation of a schedule of transmissions. At step 420, QUALITY1 is set equal to QUALITY2 and the synchronization is completed. Processing then returns to step 404.

FIGS. 4B and 4C illustrate, in timing diagram form, the receipt at a base station of the quality message and DIFF(s). As illustrated just prior to time $t_1$, the values of QUALITY1 and QUALITY2 are equal to A. The quality message receipt begins at time $t_1$. DIFF(s) are then received at times $t_2$ through $t_6$, with values indicated in the table of FIG. 4C.

Note that for each DIFF received, the QUALITY2 value is adjusted accordingly, while QUALITY1 remains unchanged. At time $t_7$ the quality message completes and sets QUALITY1 equal to B. The value B is the quality message value transmitted from the remote station at or prior to time $t_1$. The variable QUALITY2 is then adjusted according to the difference (B−A). This difference is added to the value of QUALITY2 at time $t_8$. In this way, the base station has a corrected value of QUALITY2.

Figure 5:
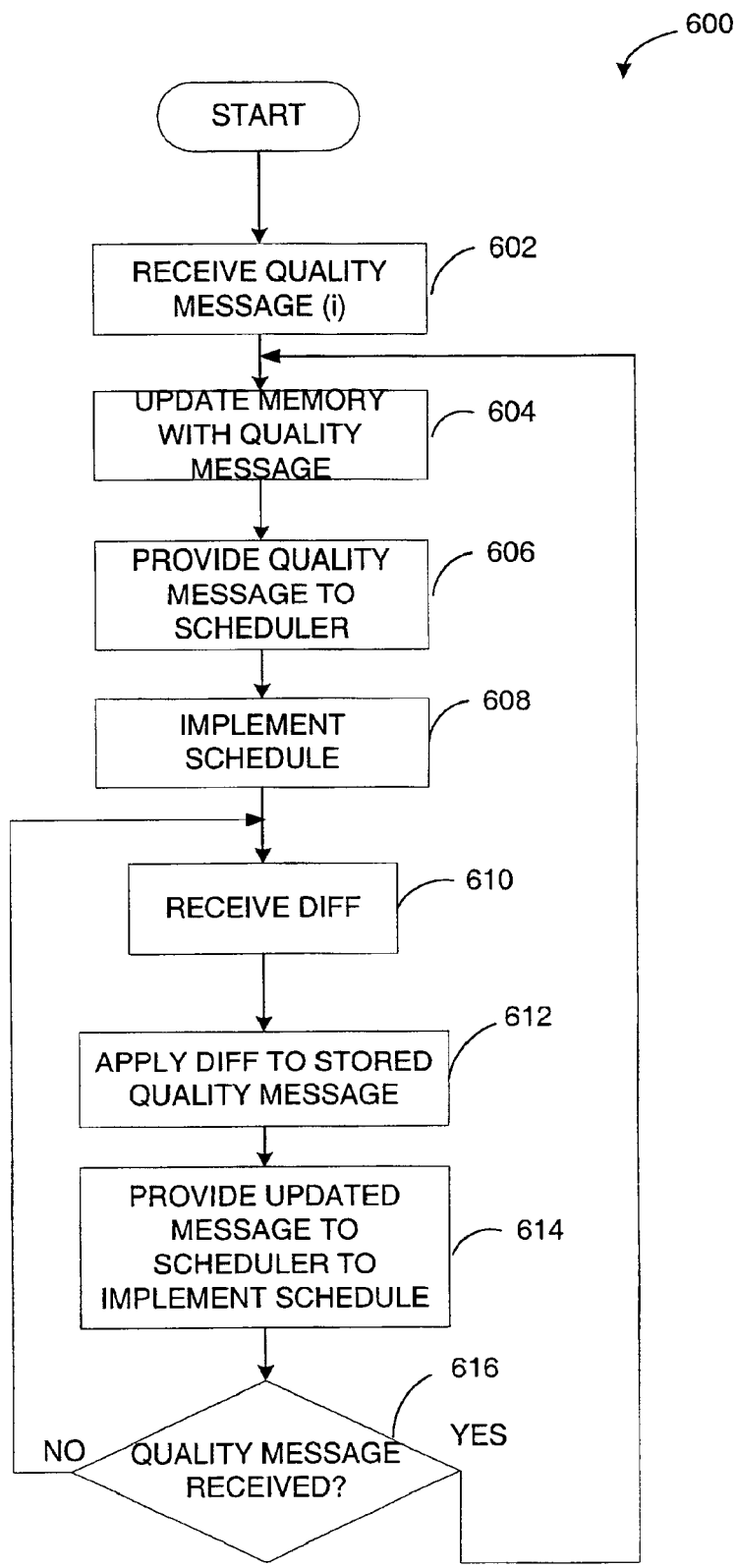
FIG. 5 is a flow diagram of a method of link quality feedback for a base station in a wireless communication system.

FIG. 5 illustrates a method 600 used in one embodiment for processing the feedback information at the base station. At step 602 the base station receives the quality message from the mobile station, wherein the quality message relates to the FL pilot signal strength. The quality message received is stored in a memory storage device at step 604. The base station provides the quality message received to a scheduler at step 606. For data communications, the scheduler is responsible for providing fair and proportional access to the base station from all access terminals having data to transmit and/or receive. The scheduling of access terminals may be performed in any of a variety of methods. The scheduler then implements the schedule at step 608. In addition to the quality message, the base station receives a differential indicator, DIFF, at step 610. The base station applies the differential indicator to the stored quality message at step 612 to track the quality of the FL channel. In this way the base station is apprised of the condition and quality of the FL channel as seen at the receiver of the access terminal. The process provides the quality message to the scheduler to implement a schedule at step 614. The process determines if a quality message is received at step 616.

Continuing with FIG. 5, if a next quality message is not received, i.e., the system is currently in the time between times $t_1$ and $t_2$ of FIG. 5, processing returns to receive the next differential indicator at step 610. However, if a quality message is received at step 616 the process returns to step 604 to store the quality message in memory. The stored quality message is adjusted with each occurrence of a differential indicator. The stored quality message is replaced on the occurrence of a quality message.

Figure 6:
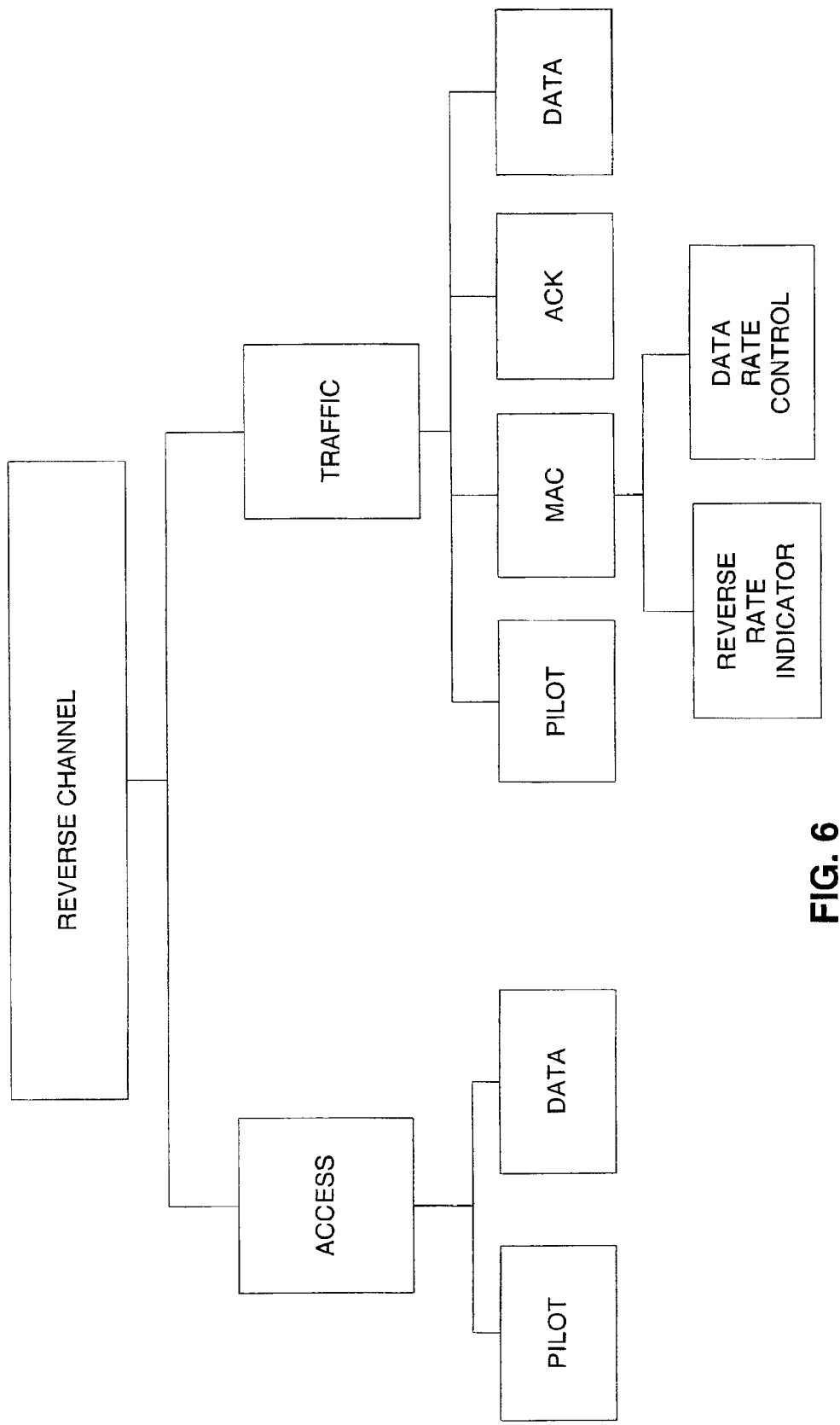
FIG. 6 is a diagram of a reverse link architecture in a wireless communication system.

Link quality feedback methods are applicable to packet-switched communication systems, such as data and voice systems. In a packet-switched system, the data is transmitted in packets having a defined structure and length. Rather than using power control to adjust the amplification of transmissions, these systems adjust the data rate and modulation scheme in response to the quality of the link. For example, in voice and data systems, the available transmit power for data transmissions is not defined or controlled, but rather is dynamically calculated as the remaining power available after satisfaction of voice transmissions. An exemplary system having a reverse link illustrated in FIG. 6 uses a data rate control and an additional sub-channel to transmit quality messages and differential indicators, respectively. As illustrated, the reverse link, or reverse channel, has two types of logical channels: access and traffic. The access channel includes sub-channels for a pilot and data, wherein the access channel is used while the traffic channel is not active. The traffic channel includes sub-channels for pilot, Medium Access Control, MAC, Acknowledge, ACK, and data. The MAC further includes sub-channels for transmission of reverse rate indicator(s) and Data Rate Control(s), DRC(s). The DRC information is calculated by the remote station or access terminal by measuring the quality of the FL and requesting a corresponding data rate for receipt of pending data transmissions. There are any number of methods for calculating the quality of the link, and determining a corresponding data rate.

According to one embodiment, the differential indicators are transmitted continuously on the reverse rate indicator channel, while the quality messages are transmitted on a DRC channel. The corresponding data rate is typically determined by a table that identifies the available and/or appropriate data rate, modulation and encoding, packet structure, and retransmission policy. The DRC messages are indices identifying the appropriate combination of specifications. In response to a link quality measurement, an increase in the data rate available increments the index. A decrease in the data rate available decrements the index. The DRC message is encoded prior to transmission. A DRC cover is applied to identify the sector of the measured FL signal, typically the FL pilot.

Figure 7:
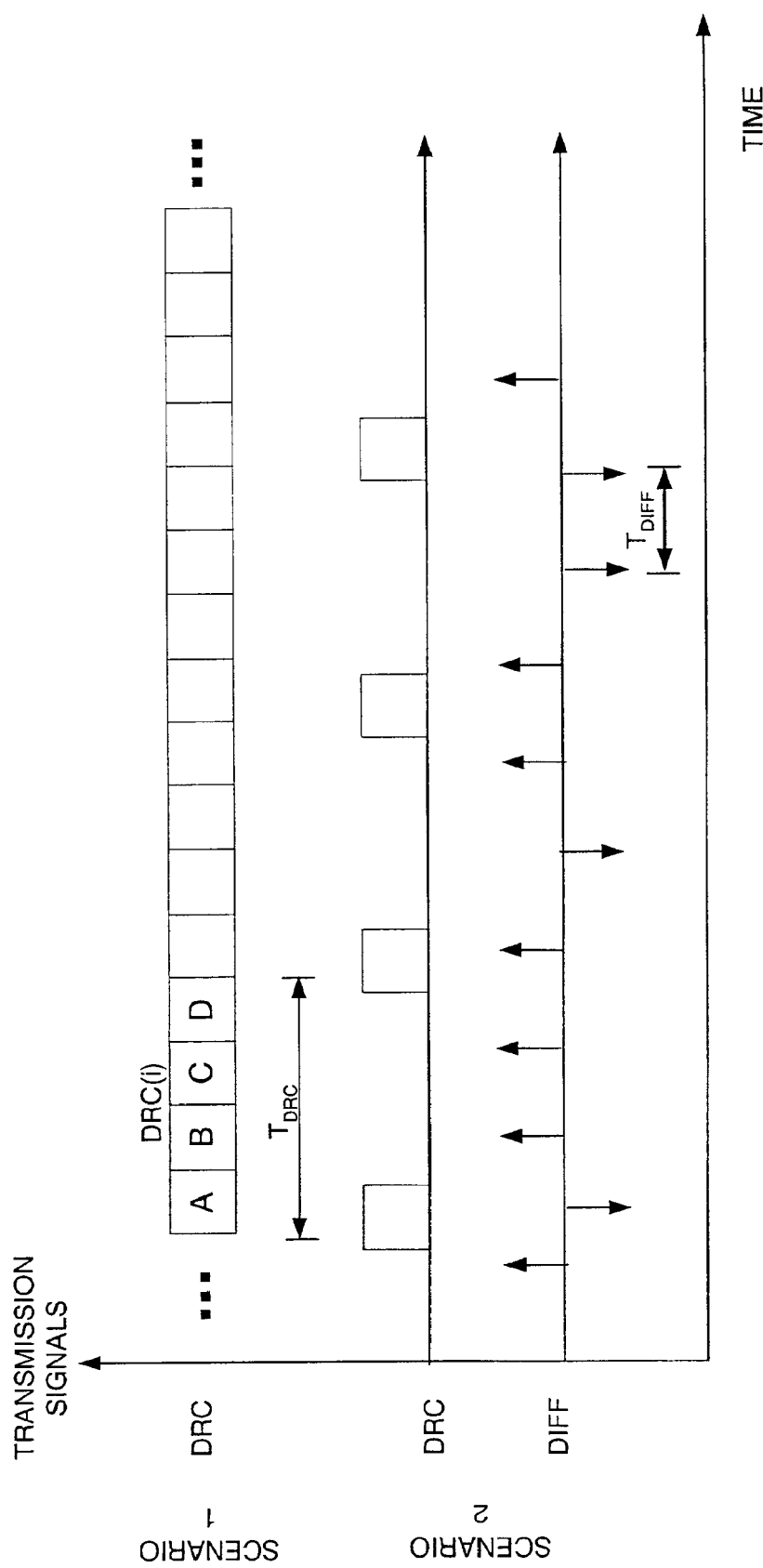
FIG. 7 is a timing diagram of link quality feedback in a wireless communication system.

Various timing scenarios are illustrated in FIG. 7. In a first scenario, the DRC information is transmitted continuously, wherein one DRC message may be repeatedly transmitted to increase the accuracy of receipt. As illustrated, DRC(i) is a four slot message, wherein the message DRC(i) is transmitted in time slots A, B, C and D. The four slot message is transmitted during time duration $T_{DRC}$. Subsequent to time slot D the next message, DRC(i+1) will be transmitted. Prior to time slot A the previous message, DRC(i−1) was transmitted. In this scenario, the quality message is implicitly included in the DRC message and is transmitted continuously. This scenario wastes bandwidth and thus reduces the capacity of the reverse link. In a second scenario the DRC message is transmitted on a gated channel, the DRC channel, once during $T_{DRC}$. The differential indicator is transmitted on a continuous sub-channel having a period of $T_{DIFF}$. The differential indicator either increments or decrements the index of the DRC message. In this way, the access network is able to accurately track the available data rates, etc., quickly, as the differential indicator is an uncoded bit or bit(s). Note that while the quality message and differential indicator have been described herein with respect to the FL, each is applicable to the RL as well.

FIG. 8 illustrates a data rate control table according to one embodiment. As illustrated, the left-most column lists a DRC message. The DRC message is effectively a code that identifies a combination of transmission parameters. The middle column corresponds to the data rate in kbps. The last column lists the packet length in time slots. Each DRC message corresponds to a combination of these transmission parameters and may also include, but is not limited to, modulation technique, encoding type, packet structure, and/or retransmission policy. Note that in the embodiment illustrated in FIG. 8, the first DRC message selects a null data rate. The null data rate is used in other processes within the system. Additionally, several DRC messages corresponds to transmission parameter sets that are not available or are invalid. These sets may be assigned to later developed systems or may be used for other functions within the system.

In an alternate embodiment, the quality message is included in the preamble of each transmission. The differential indicators are transmitted on a continuous sub-channel. The differential indicators are provided at a frequency to assist the transmitter in accurately tracking the channel quality experienced by transmitted communications.

Figure 9:
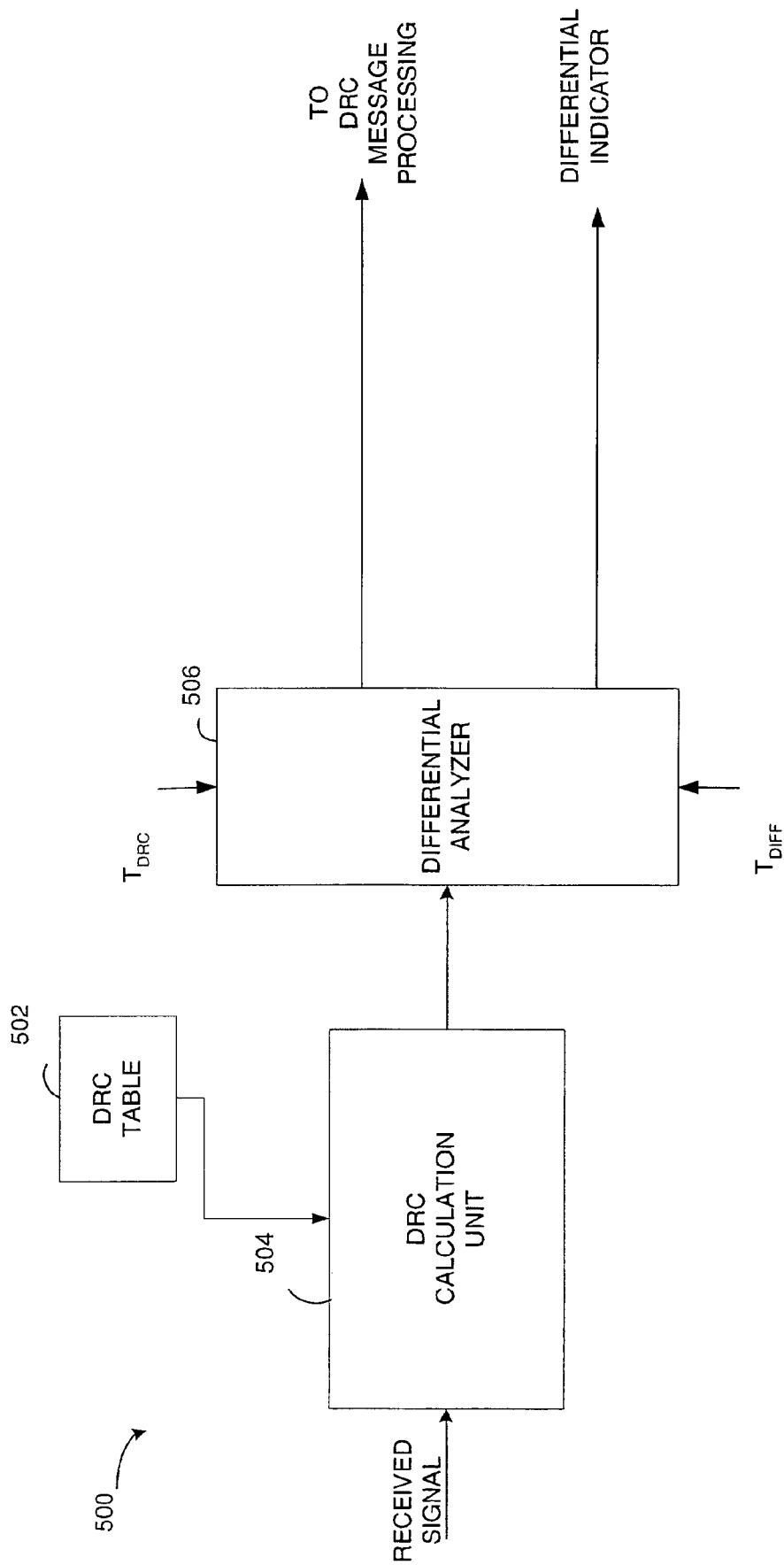
FIG. 9 is a diagram of a portion of a remote station in a packet-switched communication system.

One embodiment of a packet-switched system utilizing the DRC table of FIG. 8 is illustrated in FIG. 9. A portion 500 of an access terminal includes a DRC table 502, coupled to a DRC calculation unit 504. The DRC calculation unit 504 receives a FL signal within the packet-switched system. The DRC calculation unit 504 analyzes the received signal to determine a channel quality metric. The quality metric is a data rate. The DRC calculation unit 504 selects a transmission parameter set from the DRC table 502, wherein the set corresponds to the calculated data rate available for the FL. The set is identified by a corresponding DRC message.

The DRC calculation unit 504 provides a measured DRC to differential analyzer 506. The differential analyzer 506 generates the projected DRC message for full transmission once every DRC time period, $T_{DRC}$. The full projected DRC message transmission is gated according to $T_{DRC}$. Additionally, the differential analyzer 506 receives a differential time period signal, $T_{DIFF}$, that is used to generate differential indicators.

Successive current DRC values are compared to the projected DRC value with respect to indices in the DRC table 502. The differential analyzer 506 outputs a differential indicator in response to the comparison. The differential indicator is an incremental pointer that points to neighboring entries in the DRC table 502. If a successive DRC message increments from a previous DRC message in a given direction, the differential indicator points in that direction. The differential indicator, therefore, tracks movement within the DRC table 502. In this way, the FL transmitter receives continuous information of FL channel quality with which transmission parameters may be evaluated and/or adjusted. The feedback information is applicable to scheduling of packet-switched communications in the system. The periodic DRC message transmissions provide synchronization between FL transmitter and receiver, erroneous information generated by incorrectly received differential indicators.

Additionally, the differential indicators in a packet-switched system provide feedback that may effect more than simply the remote station generating the feedback. The access network may use the feedback information to determine a scheduling policy, as well as implementing the policy, for multiple users. In this way, the feedback information may be used to optimize the entire transmission system.

As discussed hereinabove, the periodic transmission of the quality message allows synchronization of the remote station and the base station. In an alternate embodiment, the base station transmits a projected C/I as calculated at the base station on the FL. The remote station receives the projected C/I from the base station and re-synchronizes with the base station. The transmission may be a coded message or a signal transmitted at a predetermined power level. For example, the transmission may be a dedicated pilot or a PC bit.

In addition to providing the link quality feedback, the remote station may indicate the sector that is currently being monitored by applying a cover or a scrambling code to the quality message and/or differential indicator. The cover identifies the sector of the measured pilot signal. In one embodiment, each sector in the system is assigned a scrambling code. The scrambling code is a priori knowledge to the base station and the remote station.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A remote station apparatus comprising:
    a quality measurement unit for iteratively measuring link quality of a communication link and generating a quality metric; and
    a differential analyzer for determining changes in the measured link quality and generating a differential quality metric, wherein the quality metric and the differential quality metric are to be transmitted to a base station to indicate link quality.

2. The remote station of claim 1, wherein the link quality is measured as carrier to interference of a received signal.

3. The remote station of claim 2, wherein the remote station applies a sector cover to the quality metric.

4. In a wireless communication system, a method comprising:

generating quality messages at a first frequency, the quality message providing information on the quality of a communication link; and generating differential indicators at a second frequency, the differential indicators indicating changes in the quality of the communication link, wherein the second frequency is greater than the first frequency.

5. The method of claim 4, wherein each quality message includes carrier to interference information of a received signal at a receiver.

6. The method of claim 5, wherein the received signal is a pilot signal.

7. The method of claim 4, wherein each differential indicator is at least one bit.

8. The method of claim 4, wherein generating differential indicators further comprises:

comparing a current link quality measurement to a projected link quality measurement;

decrementing the differential indicator when the current link quality measurement is less than the projected link quality measurement;

incrementing the differential indicator when the current link quality measurement is greater than or equal to the projected link quality measurement; and transmitting the differential indicator.

9. In a wireless communication system for processing voice communications and packet-switched communications, a base station comprising:

receive circuitry operative to receive signals on a reverse link, including a quality message and differential indicators, the quality message periodically providing a quality metric of a forward link, wherein the differential indicators track the quality metric between successive quality messages;

a memory storage unit operative to store a quality message received on the reverse link; and a differential analyzer to update the quality message stored in the memory storage unit in response to the differential indicators.

10. The base station of claim 9, further comprising:

a scheduler unit operative to schedule packet-switched communications in the system in response to the quality message stored in the memory storage unit.

11. The base station of claim 10, wherein the quality metric is a data rate control message.

12. The base station of claim 11, wherein:

each data rate control message corresponds to an entry in a data rate control table; and each differential indicator points to a neighboring entry in the data rate control table.

13. In a wireless communication system for processing voice communications and packet-switched communications, a transceiver comprising:

a data rate control table listing data rate control messages and associated transmission information;

a data rate calculation unit coupled to the data rate control table, the data rate calculation unit operative to select a data rate control message in response to a received signal at the transceiver; and a differential analyzer coupled to the data rate calculation unit operative to generate differential indicators pointing to a next entry in the data rate control table.

* * * * *